United States Patent
Scherl et al.

(10) Patent No.: US 7,178,819 B2
(45) Date of Patent: Feb. 20, 2007

(54) SPEED CONTROLLER HAVING A DISPLAY DEVICE

(75) Inventors: Michael Scherl, Bietigheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 10/491,736

(22) PCT Filed: Sep. 17, 2002

(86) PCT No.: PCT/DE02/03481

§ 371 (c)(1),
(2), (4) Date: Sep. 1, 2004

(87) PCT Pub. No.: WO03/031216

PCT Pub. Date: Apr. 17, 2003

(65) Prior Publication Data

US 2005/0006165 A1    Jan. 13, 2005

(30) Foreign Application Priority Data

Oct. 5, 2001 (DE) ............................... 101 49 090

(51) Int. Cl.
B60K 31/00 (2006.01)

(52) U.S. Cl. ..................... 280/170; 701/93; 701/94; 701/95; 701/96; 701/97; 701/98

(58) Field of Classification Search ................ 280/170, 280/171; 701/93–98
See application file for complete search history.

(56) References Cited

U.S. PATENT DOCUMENTS

| | | | | |
|---|---|---|---|---|
| 3,686,628 A | * | 8/1972 | Keller et al. ............. | 340/905 |
| 6,116,369 A | * | 9/2000 | King et al. ............... | 180/169 |
| 6,289,332 B2 | * | 9/2001 | Menig et al. .............. | 707/1 |
| 6,820,709 B1 | * | 11/2004 | Zimmermann et al. ..... | 180/169 |
| 6,853,903 B2 | * | 2/2005 | Michi et al. .............. | 701/93 |

FOREIGN PATENT DOCUMENTS

| | | |
|---|---|---|
| DE | 43 38 098 | 5/1995 |
| DE | 199 58 520 | 6/2001 |
| WO | WO 00/32435 | 6/2000 |

* cited by examiner

*Primary Examiner*—J. Allen Shriver
*Assistant Examiner*—Cynthia F. Collado
(74) *Attorney, Agent, or Firm*—Kenyon & Kenyon LLP

(57) ABSTRACT

A speed regulator for motor vehicles, including a standard mode in which the speed is regulated to a desired speed set by the driver, and at least one exception mode in which the speed is regulated to a setpoint speed that may deviate from the desired speed, and a display device for displaying the desired speed. An auxiliary display is also provided that indicates that an exception mode is active.

6 Claims, 2 Drawing Sheets

SPEED CONTROLLER HAVING A DISPLAY DEVICE

FIELD OF THE INVENTION

The present invention relates to a speed controller for motor vehicles having a standard mode in which the speed is regulated to a desired speed set by the driver, and at least one exception mode in which the speed is regulated to a setpoint speed that may differ from the desired speed, and a display device for displaying the desired speed.

BACKGROUND INFORMATION

Speed controllers of this type make it possible to regulate the speed of the vehicle to a desired speed selected by the driver. If the sensor device also includes a distance sensor, for example in the form of a radar sensor, a stereo camera system or the like, then the vehicle speed can also be regulated so that an appropriate safety distance from a vehicle ahead is automatically maintained. An example of a regulating system of this type, which is also known as an ACC system (Adaptive Cruise Control), is described in "Adaptive Cruise Control System—Aspects and Development Trends" by Winner, Witte, Uhler and Lichtenberg, Robert Bosch GmbH, in SAE Technical Paper Series 961010, International Congress & Exposition, Detroit, Feb. 26–29, 1996.

Since, however, full detection and reliable evaluation of the traffic environment is not yet possible using the available sensor devices, these systems have previously been suitable primarily for relatively stable traffic situations such as driving on a superhighway or expressway. In inner-city traffic or when driving at low speeds on curvy roads, on the other hand, the uncertainties involved in detecting the particular relevant target object could result in the risk of an accident. For this reason, conventional ACC systems have been designed previously so that they can only be activated above a specific limiting speed.

It has already been proposed that the range of applications of the ACC system be expanded to include a traffic situation that is referred to as stop and go traffic and which occurs, for example, in a traffic jam or in slow-moving traffic. This traffic situation is also relatively stable and is therefore suitable for automatic distance regulation. However, the functionality must be expanded so that starting and stopping processes can also be controlled automatically.

In addition, the range of applications of this stop and go function should be limited to speeds below a specific value, in which case the speed ranges for the ACC function and the stop and go function may overlap.

If the driver activates the stop and go function in the case of a traffic jam, it is advisable to keep the desired speed previously selected for the standard mode stored so that the driver, after the traffic jam has broken up, may accelerate again to the earlier desired speed by inputting a simple button-activated command (resume).

As long as the stop and go function is active, however, the vehicle cannot be accelerated beyond the limiting speed that applies to this function. If the distance from the vehicle ahead increases as a consequence of the breaking up of the traffic jam, the speed controller regulates the vehicle speed to a setpoint value which corresponds to the allowed limiting speed for the stop and go function, to 50 km/h, for example. Not until the driver actively gives the command to switch off the stop and go function and to return to the standard mode or to the ACC function, may the vehicle again be accelerated to the old desired speed.

Thus situations may occur in which the setpoint value to which the speed is actually regulated differs from the desired speed set by the driver. This may result in driver irritation.

SUMMARY

An object of the present invention is to create a speed controller having a display device in which the actual behavior of the speed controller is made transparent for the driver.

This object may be achieved according to the present invention by an auxiliary display that displays that an exception mode is active.

If the driver ascertains that the desired speed that he (she) has entered is, against expectations, not maintained or restored, then the auxiliary display will display the reason for this unexpected response so that the driver may respond appropriately to this situation, such as by switching again from the stop and go function to the ACC function.

A difference between the setpoint speed and the desired speed may also occur in situations other than the ones described above, such as when the driver, during stop and go operation, attempts to raise the desired speed above the limiting speed allowed for the stop and go function or when, after the speed controller has been switched off temporarily, the driver again activates the stop and go function by using the resume command but the desired speed that is still stored is higher than the allowed limiting speed.

The operation modes in which the speed is not regulated directly to the desired speed but instead to a possibly different setpoint speed shall together be referred to as "exception modes." Distance regulation in conjunction with the ACC function may also be included among these exception modes in the broader sense since in this type of distance regulation the setpoint speed is determined by the speed of the vehicle ahead and is generally lower than the desired speed set by the driver.

In one particularly preferred embodiment, the setpoint speed is displayed quantitatively by the auxiliary display. Since, preferably, the set desired speed is also displayed quantitatively, the displays for the setpoint and desired speeds should be distinguishable visually so that mixups are avoided.

The display device is preferably integrated into the speedometer on the dashboard such that both the desired speed and the setpoint speed are signaled by the lighting up of indicator lights, such as light-emitting diodes, at the positions on the speed scale that correspond to the respective speeds. The distinction between setpoint and desired speed may then be achieved, for example, by having the light-emitting diode for the setpoint speed flash or appear less bright or have a different color than the light-emitting diode for the desired speed.

If only a single fixed speed is possible as the setpoint speed, such as the fixed upper limiting speed for the stop and go function, the auxiliary display may be formed by a single light-emitting diode that is integrated into the speedometer at the appropriate location. If different values are possible for the setpoint speed, the auxiliary display may be formed by several light-emitting diodes distributed over the speed dial of the speedometer. If necessary, the same light-emitting diodes may be used for the auxiliary display as for displaying the variable desired speed, in which case a distinction is made possible by triggering the light-emitting diodes using different degrees of brightness, flashing or non-flashing, or with different flash frequencies.

Alternatively, a numerical display of the setpoint speed is also possible.

A quantitative display of the setpoint speed also offers various advantages in conjunction with distance regulation. If the vehicle traveling at the set desired speed drives up to a slower vehicle ahead, for example, the speed controller will gradually reduce the setpoint speed to the speed of the vehicle ahead. Since, however, the speed controller has only a limited deceleration capability, the setpoint speed will get ahead of the actual speed displayed by the speedometer needle. Displaying the setpoint speed then allows the driver to estimate the speed of the vehicle ahead earlier so that it is easier for him (her) to decide whether to remain behind the vehicle ahead or to begin to pass. In addition, displaying the setpoint speed may also increase transparency in cases in which the speed controller mistakenly recognizes a vehicle traveling in the adjacent lane as the target object, for example because the driver of that vehicle has moved a relatively great distance from the center of its own traffic lane in the direction of this adjacent lane. The change in the target object is then apparent from a sudden decrease in the setpoint speed.

In conjunction with the stop and go function, it is advisable under specific conditions detectable by sensors, such as when turning, to issue a takeover prompt to the driver and, if the driver does not comply with this prompt within a certain time span, to regulate the speed forcibly downward to a very low speed, such as to 10 km/h, so that endangerment of other road users is avoided when turning into the new street. This situation may also be made transparent by displaying the setpoint speed of 10 km/h, which at that point is very low.

BRIEF DESCRIPTION OF THE DRAWINGS

Example embodiments of the present invention are explained below with reference to the figures.

DESCRIPTION OF EXAMPLE EMBODIMENTS

Figure 1:
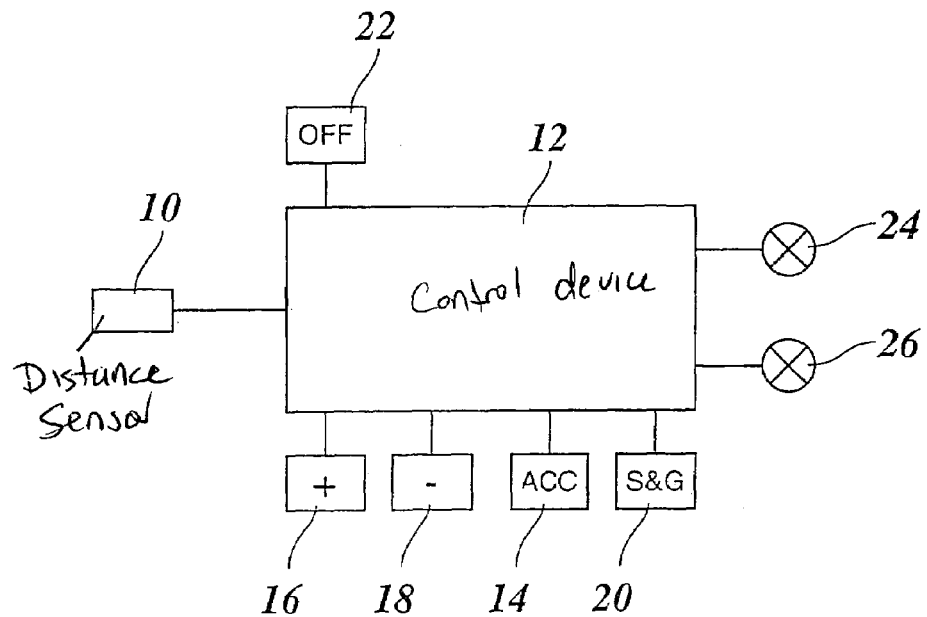
FIG. 1 shows a block diagram of the speed controller and associated control and display elements.

Since the design and mode of operation of a speed controller having an ACC function are conventional, FIG. 1 shows only the most important components in a block diagram. A sensor device includes a distance sensor 10, such as a radar sensor, that measures the distance from a vehicle ahead and that vehicle's relative speed. If several target objects are detected by the radar sensor, for example several vehicles or even stationary targets such as road signs and the like, the target object that is formed by the vehicle immediately ahead is selected through plausibility evaluation.

The sensor device also includes conventional sensors such as a driving speed sensor, acceleration sensors for detecting longitudinal acceleration and transverse acceleration, a yaw rate sensor and the like, which are present in the vehicle anyway and whose signals are also used for other regulating purposes. The signals of the distance sensor and the other sensors are evaluated in an electronic control device 12, which is formed by a microcomputer, for example. Control device 12 acts on the vehicle's drive and braking system to regulate the driving speed either to a desired speed selected by the driver (standard mode) or to a suitable distance from the vehicle ahead.

This regulating function, referred to below as the ACC function, is activated by the driver by pressing an ACC button 14. If a desired speed has already been stored earlier, the pressing of the ACC button has the function that regulation to this desired speed is resumed again ("resume"). Otherwise, the desired speed is set by the driver's briefly pressing a button 16 after the vehicle has reached the desired speed. Repeated or continuing pressing of button 16 brings about a gradual increase in the desired speed. Likewise, the pressing of a button 18 brings about a gradual reduction of the desired speed.

The ACC function turns itself off automatically as soon as the vehicle's speed falls below a specific value $V_1$ of 40 km/h, for example. However, as soon as the speed is below a higher value $V_2$, which is 50 km/h, for example, the driver may activate a stop and go function by pressing a button 20. The driver will make use of this possibility, for example, when he (she) drives up to the back end of a traffic jam. The stop and go function then causes the vehicle to be brought automatically to a standstill at a suitable distance from the end of the traffic jam. If the vehicle that is stopping in front of the object vehicle moves forward a short distance, the stop and go function causes the object vehicle to start up automatically and also move forward a corresponding distance. The speed of the object vehicle is then automatically limited to speed $V_2$ or a lower desired speed selected by the driver using buttons 16 and 18. It shall be assumed in this case, however, that the desired speed cannot be selected to be lower than $V_1$.

The speed controller can be deactivated by way of a button 22, regardless of whether the stop and go function or the ACC function is active at that point.

Figure 2:
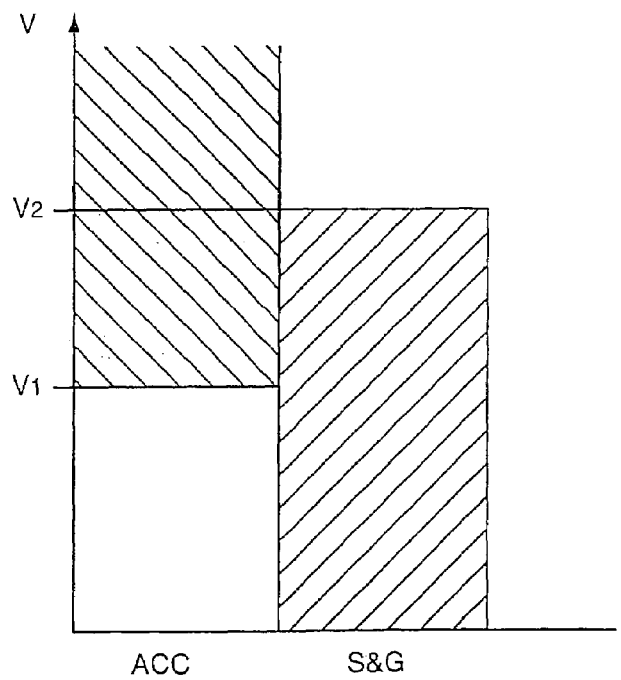
FIG. 2 shows a diagram for explaining speed ranges in which different functions of the speed controller are applicable.

FIG. 2 illustrates the speed ranges in which the ACC function and the stop and go function are activatable. In the speed range between $V_1$ and $V_2$, both functions are activatable, but the two functions are mutually exclusive.

The lighting up of an indicator light 24 (FIG. 1) indicates that the ACC function is active. This indicator light 24 exhibits an intermediate state between the switched on and the switched off state. This intermediate state is formed, for example, by the fact that the light is dimmer when it lights up, shows a change in color, or that the frame around the light lights up and indicates that the ACC function is activatable but is not active. Similarly, a lit-up or intermediate state of an indicator light 26 indicates that the stop and go function is active or activatable.

By pressing on the gas pedal, the driver is able to override both the ACC function and the stop and go function in order to accelerate temporarily to a higher speed. Pressing on the brake pedal, on the other hand, has the function of deactivating the speed controller, just like pressing button 22. If the driver has decelerated the vehicle to a standstill himself (herself), the stop and go function may not be re-activated from a standstill but only after the driver has put the vehicle in motion again himself (herself) by pressing on the gas pedal.

Figure 3:
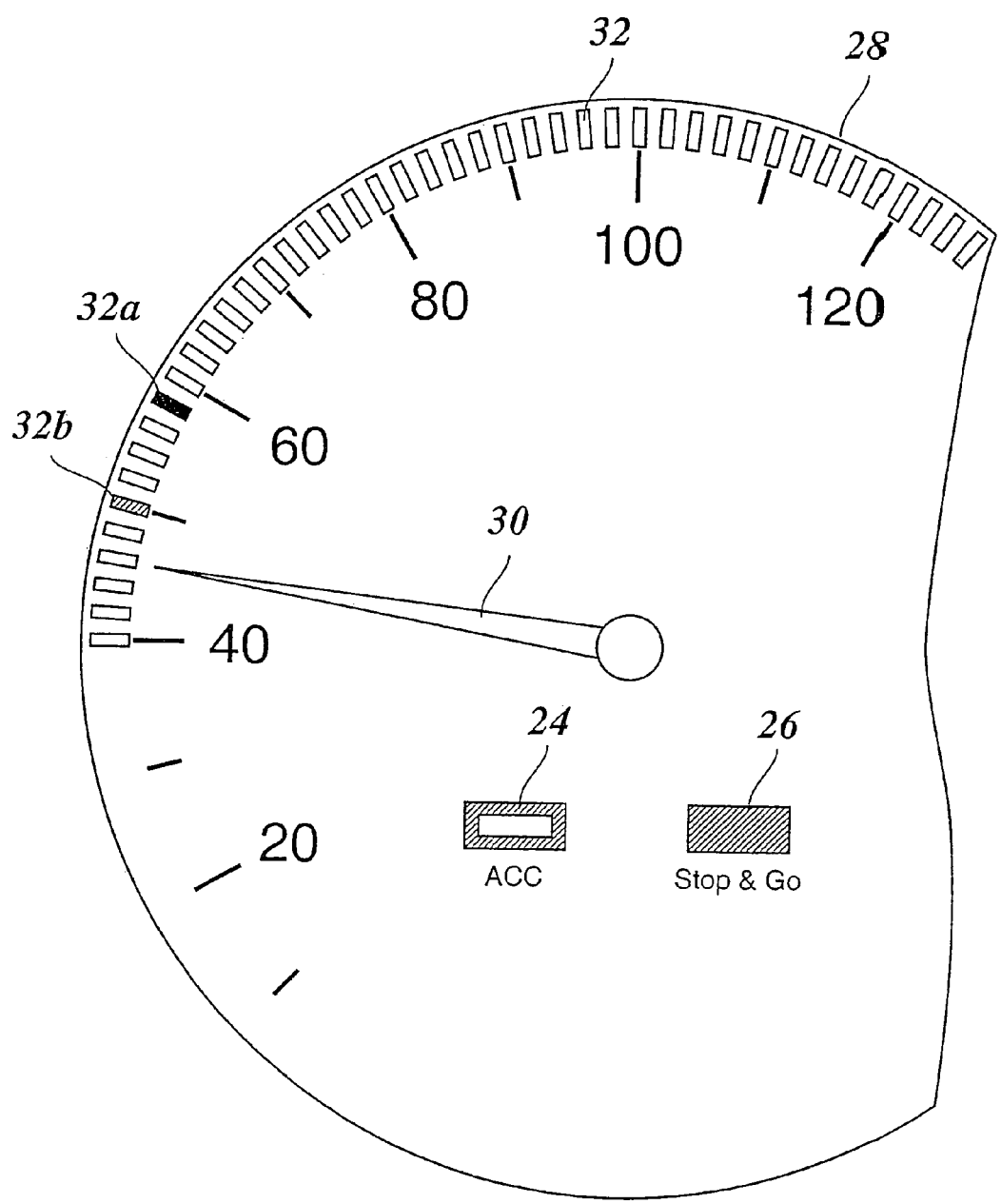
FIG. 3 shows a display device that is integrated into a speedometer on the dashboard of the motor vehicle.

FIG. 3 shows a speedometer 28 as it is normally positioned on the dashboard of a motor vehicle. Speedometer 28 has, as is customary, a speed dial and a speedometer needle 30 and also includes indicator lights 24 and 26 for the ACC function and the stop and go function, as already mentioned above.

In the example shown, the instantaneous driving speed is 46 km/h, and it is thus between speed $V_1$ of 40 km/h and speed $V_2$ of 50 km/h, so that both the ACC function and the stop and go function could be active. In this case, it has been assumed that the stop and go function is active so that indicator light 26 is fully on, whereas in the case of indicator light 24 only a frame lights up. This indicates that although the ACC function is activatable, it is not active.

The display device of the speed regulator also includes a plurality of light-emitting diodes 32 which are distributed equally at 2-km/h intervals over the speed scale starting at 40 km/h. The lighting up of one of these light-emitting diodes 32 indicates the desired speed, which was set using one of buttons 16, 18. In the example shown, the set desired speed is 58 km/h, and consequently the light-emitting diode assigned to this speed lights up. However, since it is not the ACC function but the stop and go function that is active, the vehicle speed does not increase above 50 km/h ($V_2$), even when the traffic situation permits higher speeds. This means that if no distance regulation is required, the speed will be regulated to a setpoint speed of 50 km/h. This circumstance is displayed here by the fact that light-emitting diode (auxiliary display) 32b, which corresponds to the setpoint speed of 50 km/h, lights up. This light-emitting diode, however, is controlled such that its brightness is less than that of light-emitting diode 32a.

If the road is clear, the speedometer needle will hunt to a steady state at 50 km/h. Should the driver desire to accelerate again to the desired speed of 58 km/h, the lighting up of light-emitting diode 32b shows the driver that he (she) must press button 14 in order to switch from the stop and go function to the ACC function. When the driver presses button 14, indicator light 24 lights up completely, and at the same time light-emitting diode 32b goes out. In the case of indicator light 26, only a frame lights up, as long as the speed is still lower than 50 km/h and thus the stop and go function may be activated. If the speed increases to above 50 km/h, indicator light 26 goes out completely.

As FIG. 3 shows, a desired speed may also be set in the speed range between 40 and 50 km/h. This is then displayed by the corresponding light-emitting diode 32 lighting up bright. In this speed range, the desired speed may be set both in the ACC mode and in the stop & go mode. Light-emitting diode 32b is completely turned off in both cases unless the set desired speed is exactly 50 km/h. If the driver increases the desired speed gradually by pressing and holding button 16, the position of light-emitting diode 32a, which is turned on, moves gradually to higher speeds, and the vehicle is accelerated accordingly. If, however, the desired speed is increased above 50 km/h in the stop and go mode, then light-emitting diode 32b also lights up again, and the speed is maintained at 50 km/h until the driver presses button 14 again.

This functionality may be utilized by the driver in the following way, for example. If the speed controller is in the stop and go mode and the vehicle in this mode reaches a stretch of road in which there is a speed limit of 60 km/h, for example, then, as a precautionary measure, the driver may increase the desired speed to 60 km/h by pressing button 16 in order to ensure that the speed limit is not exceeded. If, then—perhaps only after a long period of time—the traffic jam breaks up and the driver switches to the ACC mode, the speed remains limited to 60 km/h, even if the driver has in the meantime forgotten that there is a speed limit.

In the example described here, it has been assumed that the stop and go function may only be activated if the vehicle speed is lower than $V_2$, i.e., no higher than 50 km/h. In a modified embodiment, however, the speed controller may be designed such that the switch to the stop and go function is permitted under certain conditions, even at a higher speed. If the vehicle drives up to the end of a traffic jam at a speed higher than 50 km/h, for example, the speed controller will recognize, by reference to the measured relative speed of the vehicle ahead and by reference to the object vehicle's speed that the absolute speed of the vehicle ahead is less than 50 km/h. It is therefore foreseeable that the speed of the object vehicle will decrease to 50 km/h or less. Under these conditions, the switch to the stop and go function may be permitted as an exception if the speed is still higher than 50 km/h. This is then displayed by the fact that a frame around indicator light 26 lights up. If the driver then presses button 20 to activate the stop and go function, light-emitting diode 32b lights up dimly, and the speed is regulated downward to 50 km/h maximum.

Light-emitting diode 32a, which indicates the set desired speed, remains turned on (bright) even if the driver turns off the speed regulating function completely by pressing button 22. If the driver then re-activates the stop and go function by pressing button 20, light-emitting diode 32b lights up dimly to indicate that the speed is being regulated not to the set desired speed but to the speed of 50 km/h.

With regard to the mode of operation of the display device in the stop and go mode, two embodiments are possible. In a first example embodiment, light-emitting diode 32b only lights up if the road is clear, and it goes out if a target object is tracked whose speed is lower than 50 km/h. In a modified embodiment, light-emitting diode 32b remains on continuously as long as the stop and go function is active. In this case the information contents of light-emitting diode 32b and of indicator light 26, which is fully on, are redundant, and it is possible to replace these two elements by a single display element. For displaying the activatability of the stop and go function, this display element should then have an intermediate state analogous to indicator light 26.

What is claimed is:

1. A speed controller for a motor vehicle, comprising:
   a controller having a standard mode in which a speed of the vehicle is regulated to a desired speed set by a driver of the vehicle, and having at least one exception mode in which the speed of the vehicle is regulated to a setpoint speed that differs from the desired speed;
   a display device configured to display the desired speed; and
   an auxiliary display which indicates that an exception mode is active;
   wherein the exception mode is a stop and go mode in which the vehicle is automatically decelerated to a standstill if a distance sensor detects a stationary obstacle in the vehicle's own traffic lane;
   wherein the speed of the vehicle in the stop and go mode is limited upward by a specified limiting speed;
   wherein the auxiliary display is formed by an indicator light that is located in a speedometer of the vehicle at a point on a speed scale of the speedometer that corresponds to the limiting speed.

2. The speed controller as recited in claim 1, wherein the auxiliary display indicates quantitatively the setpoint speed to which the speed of the vehicle is regulated.

3. A speed controller for a motor vehicle, comprising:
   a controller having a standard mode in which a speed of the vehicle is regulated to a desired speed set by a driver of the vehicle, and having at least one exception mode in which the speed of the vehicle is regulated to a setpoint speed that differs from the desired speed;
   a display device configured to display the desired speed; and
   an auxiliary display which indicates that an exception mode is active;

wherein the exception mode is a stop and go mode in which the vehicle is automatically decelerated to a standstill if a distance sensor detects a stationary obstacle in the vehicle's own traffic lane, and wherein the auxiliary display includes an indicator light having three states which correspond to an inactive state, an activatable state, and an active state of the stop and go mode.

4. The speed controller as recited in claim 1, wherein the auxiliary display includes a plurality of indicator lights that can be turned on selectively, which are integrated into a speed scale of a speedometer of the vehicle.

5. The speed controller as recited in claim 1, wherein the display device configured to display the desired speed is formed by a plurality of indicator lights, which are integrated into a speed scale of a speedometer of the vehicle.

6. The speed controller as recited in claim 1, wherein the display device configured to display the desired speed and the auxiliary display are formed by the same indicator lights, which are triggerable using at least one of different degrees of brightness, flashing, non-flashing, or flashing frequency so as to distinguish between the setpoint speed and the desired speed.

* * * * *